C. VAN HOUTEN.
Corn Planter.

No. 21,583.

Patented Sept. 21, 1858.

UNITED STATES PATENT OFFICE.

CHARLES VAN HOUTEN, OF SUNBURY, OHIO.

IMPROVEMENT IN CORN-PLANTERS.

Specification forming part of Letters Patent No. 21,583, dated September 21, 1858.

*To all whom it may concern:*

Be it known that I, CHARLES VAN HOUTEN, of Sunbury, in the county of Delaware and State of Ohio, have invented a new and useful Improvement in Adjustable Corn-Planters; and I do hereby declare that the following is a full, clear, and exact description of the same, reference being had to the accompanying drawings, forming a part of this specification, in which—

Figure 1:
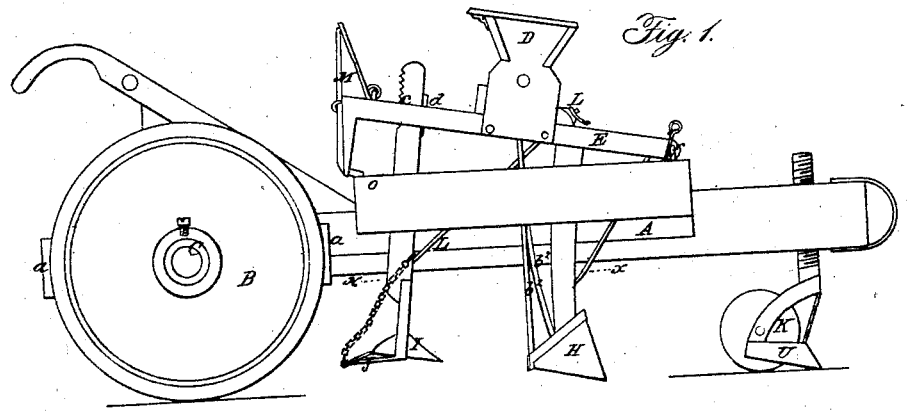
Figure 2:
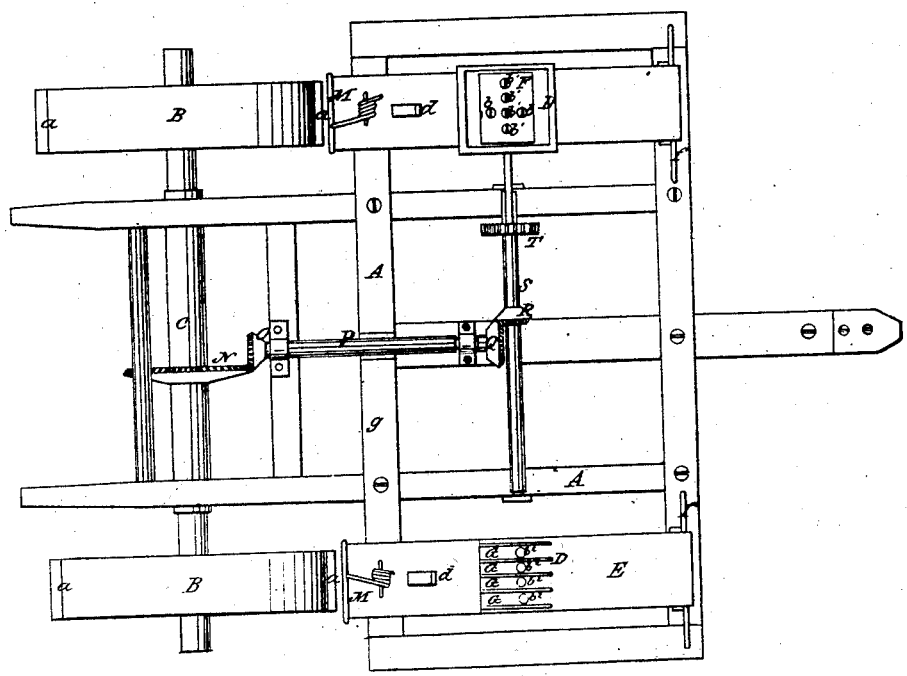
Figure 3:
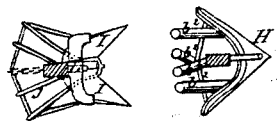

Figure 1 is a side elevation of a corn-planter with my improvements applied to it, the covering-share, &c., being elevated out of operative condition. Fig. 2 is a plan or top view of the same. Fig. 3 is a horizontal section in the line $x\ x$ of Fig. 1.

Similar letters of reference in each of the several figures indicate corresponding parts.

The nature of my invention consists, first, in the employment of the hinged adjustable and laterally-sliding hopper and share frames furnished with a spring stop or catch, in combination with a long transverse pinion and the propelling-axle, in the peculiar manner hereinafter specified.

It consists, second, in the combination of the hinged grated apron with the subsoiling covering-shares and furrow-opener, whereby the furrow is opened and the dirt thrown to each side and subsoiling performed, and the subsoil perfectly pulverized before falling upon the corn, and any desired quantity of soil can be thrown upon the corn.

To enable others skilled in the art to make and use my invention, I will proceed to describe its construction and operation.

A represents the frame of the machine, B B the propelling-wheels, and C the axle. The propelling-wheels have markers or stampers $a\ a$ on their circumference. These markers press the soil down upon the corn, and also indicate where hills have been planted.

D D are the hoppers. They are arranged on adjustable boards or auxiliary frames E E of the main frame A. These hoppers are each furnished with a distributing-roller, F, which has a horizontal and vertical row of seed-cells, $b\ b'$, so that corn may be planted in hills or drills. When it is desired to plant in drills all of the vertical cells, with the exception of one, are plugged by screwing out the heads of screws which form the bottoms of the cells flush with the circumference of the distributing-roller; and when it is desired to plant in hills the horizontal cells, with the exception of one, are plugged in a similar manner.

G G G G are channels formed on the bottom of the hoppers for conducting the grains of corn singly into tubes $b^2\ b^2\ b^2\ b^2$, said tubes leading down to the soil and depositing the corn, at equal distances apart, into the furrow formed by the share H. The tubes and shares are attached to the under side of the auxiliary frames and rise and fall with it when an adjustment is made. The share is so shaped that it throws the soil to either side.

Behind the shares or furrow-openers coverers I I are arranged. These coverers are also attached to the auxiliary frames, being set so as to cut deeper than the furrow openers, and being narrow enough to run into the furrow and subsoil at the bottom of the same.

To the rear of the coverers a grated reversely-inclined apron, J, is hinged. On this apron the soil falls back, and is pulverized before it deposits upon the corn.

The furrow-opener is adjustable, so as to cut shallow or deep by means of the steering-wheel K, which is screwed into the tongue, and, by being lowered or raised, adjusts the tongue, and thereby adjusts the furrow-shares. The coverers are adjustable for a similar purpose by means of teeth $c\ c$, wedges $d\ d$, and screw-rods L L, and the whole—hoppers, furrow-openers, and coverers—can be adjusted together out of operative condition, as shown in Fig. 1, by means of the auxiliary frames, which are hinged so as to turn and slide to long brackets $f\ f$ of the main frame. By thus hinging the auxiliary frames the width that the rows of corn are apart can be decreased or increased, as the hopper-tubes, &c., can be moved laterally in or outward.

M is a spring-catch on the rear end of each of the auxiliary frames. This catch takes into one of a series of notches or stop-holes in the main frame when the parts are in operative position, or rest upon the upper edge of the timber $g$ of the main frame when the parts are out of operative condition, as shown in Fig. 1, and the connection of the distributing-cylinders and the propelling-axle broken.

The motion to the seed-distributers is transmitted from the propelling-axle by means of bevel-gears N O, connecting-rod P, bevel-gears Q R, and long and short pinions S T T, arranged as shown.

It will be seen that by using the long pinion the connection between the parts will be maintained, whatever may be the lateral adjustment of the auxiliary frames, so long as the auxiliary frames are in operative position; but that so soon as said frames are raised out of operative position the pinions T T will be thrown out of gear with the long pinion and the distribution of the corn stopped.

U is a clearer in front of the steering-wheel.

This machine is adjustable in every way necessary, and is compact and well adapted for planting corn perfectly in either hills or drills.

What I claim as my invention, and desire to secure by Letters Patent, is—

1. The employment of the hinged adjustable and laterally-sliding hopper and share-frames E, furnished with a spring stop or catch, M, in combination with a long transverse pinion, S, and the propelling-axle C, substantially as and for the purposes set forth.

2. The combination of the hinged grated apron J with the subsoiling covering-share I and furrow-opener H, substantially as and for the purposes set forth.

CHAS. V. HOUTEN.

Witnesses:
G. YORKE AT LEE,
H. H. YOUNG.